United States Patent Office 3,421,570
Patented Jan. 14, 1969

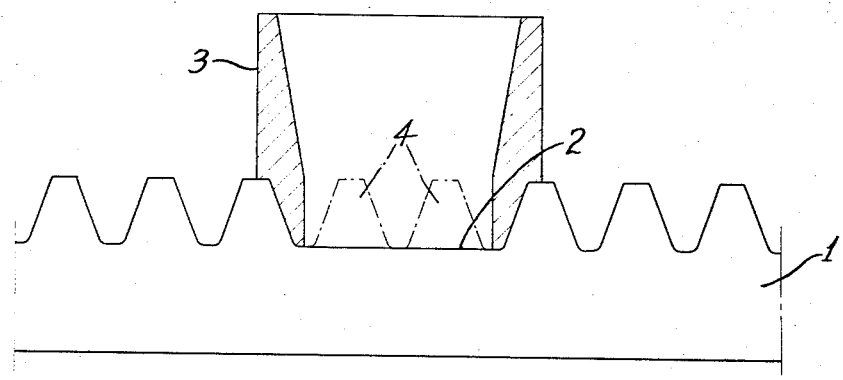
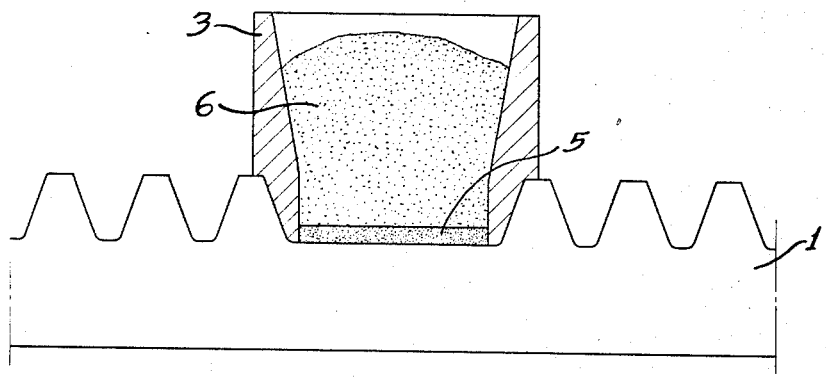
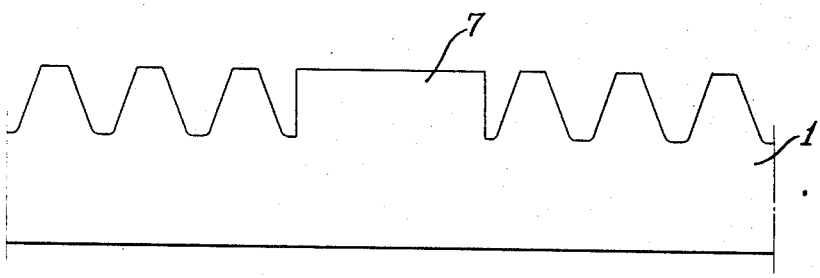

3,421,570
ALUMINOTHERMIC WELDING PROCESS
Hans Guntermann, Essen-Steele, Germany, assignor to Elektro-Thermit G.m.b.H., Essen, Germany, a corporation of Germany
Continuation of application Ser. No. 395,854, Sept. 11, 1964. This application Feb. 20, 1967, Ser. No. 617,420
U.S. Cl. 164—53      6 Claims
Int. Cl. B22d 23/00

ABSTRACT OF THE DISCLOSURE

The present invention relates to an aluminothermic welding process, preferably for welding ferrous materials such as iron and steel, in which an aluminothermic mass is applied to the surface of a workpiece to be welded and is ignited while in place.

---

This is a continuation of Ser. No. 395,854 filed Sept. 11, 1964, now abandoned.

Aluminothermic welding processes which employ the reduction of heavy metals from their oxides with the aid of aluminum have been known previously and are utilized in a conventional manner for welding joints and in built-up welding, particularly of steel and iron. In the aluminothermic welding of joints, particularly of rails and workpieces having large cross-sections to be welded, the ends of the workpieces to be welded are placed with a gap between them in a casting mold, preheated in the mold, and then fused together by intermediate casting and recasting of the aluminothermically produced welding material or weld metal. In aluminothermic built-up welding, the area to be welded is enclosed within a mold, which is usually open at the top, the welding area is preheated and aluminothermically produced welding material is then poured onto the base material with the use of a pouring pot or pouring spout.

The molten welding material or welding metal used for welding in the known casting processes is usually produced in a generally conically-shaped reaction and pouring crucible which has an outlet at the bottom thereof. With the outlet opening closed, the crucible is filled with an aluminothermic mixture and reaction is induced by punctiform ignition. The welding material or weld metal, produced within a few seconds during the reaction, is collected in the lower part of the crucible while the lighter high-melting point slag ($Al_2O_3$) rises to the top. After the reaction is completed, the crucible is tapped off at the bottom and the molten melt is poured into the mold as a homogeneous welding material or weld metal, the composition of which is conformed to that of the base metal to be welded. The slag flowing out after the welding material is collected in separate slag pans, for example, or in a slag sump or tank mounted in the upper part of the mold.

In these known thermit welding processes, the aluminothermically produced welding material or weld metal is poured into a mold from a casting crucible as a homogeneous slag-free melt and the slag does not contact the base metals to be welded. The complete separation of steel and slag is a prerequisite in these known processes in order to obtain a faultless weld. If liquid slag, which has a melting point of about 2000° C., contacts the preheated base metals to be welded, it solidifies immediately and can not be melted by the molten aluminothermically produced steel which has a temperature of about 2000° C. For this reason, precautions must be taken to ensure that no slag spatter, formed during the reaction, is introduced into the casting mold and, thus, comes into contact with the material to be welded, i.e., the welding surfaces.

Also known in the art is the aluminothermic built-up welding process wherein an aluminothermic mass is applied directly onto the surfaces of workpieces to be welded and is ignited in place. This process has not proved to be useful in practice, however, since the welded joints produced in this manner are imperfect because of the unavoidable inclusion of slag. The cause thereof is the aluminothermic slag ($Al_2O_3$) formed during the reaction which has a very high melting point and which solidifies on the colder base metal to be welded during the reaction, thereby preventing complete fusion between the base metal or material and the weld metal.

The present invention relates to a thermit welding process wherein the aluminothermic mass is directly applied onto the welding area and is ignited in place but wherein the welding surfaces, prior to the application of the aluminothermic mixture producing the weld metal, are covered by a low-melting point mass which protects the welding surfaces from the high-melting point slag produced during the aluminothermic reaction.

Such low-melting point masses are commercially available as so-called welding powders for under-powder welding and electric slag welding. These powders may exert a limited influence on the steel to be welded and should have a silicon content as low as possible. The composition of such commercial products has been described, for example, in the journal "Schweissen und Schneiden," (Welding and Cutting), 9th year (1957), p. 15, Table 4. An exemplary composition of such a low-melting point mass is, by weight, about 18% $SiO_2$; 20% $Al_2O_3$; 7% $MnO$; 15% $CaO$; 15% $MgO$; and 25% $CaF_2$. The melting point of such a powder is about 1050° C. It is possible to also employ other powders which are distinguished from the powders normally used for under-powder welding by higher contents of $CaO$, $MgO$, and $CaF_2$. The total of these latter constituents should be at least 15% by weight.

In built-up welding, for which the present process is particularly suitable, the surface to be welded is enclosed within a wall formed from highly refractory sand or in a casting mold which is open at the top and made by the $CO_2$ solidification process, whereby the hollow chamber formed by the walls of the mold and the surface of the workpiece has a capacity corresponding to the quantity of welding material to be used. If the composition and configuration of the workpiece to be welded require that preheating be effected, this is performed locally at a suitable height or by heating the entire workpiece in a furnace. After placing the mold in position and after the preheating operation, if necessary, the low melting mass is applied onto the point to be welded or onto the welding area in a thickness which is generally between 3 to 5 mm. The welding material is then poured onto this mass. The aluminothermic reaction is then initiated in known manner by ignition whereupon the melting and welding process proceeds automatically.

The invention will be further illustrated by reference to the accompanying drawings in which:

FIGURE 1 is a view in elevation of a rack having two missing teeth which are to be replaced and showing a casting mold in position thereon, FIGURE 2 is a view in elevation of the rack of FIGURE 1 showing the casting mold in position and having a low melting material and an aluminothermic mass therein, and FIGURE 3 shows the rack of FIGURE 1 with a hardened mass of aluminothermically produced steel welded onto the damaged portion.

Referring to FIGURE 1, the rack 1 has a surface 2 which is surrounded by the casting mold 3. Two teeth 4, shown in phantom, are to be replaced on the surface 2 of the rack 1. In FIGURE 2 there is shown a low melting mass 5 applied to the surface 2 of the rack 1 over which is poured the aluminothermic mass 6. In FIGURE 3 the rack 1 has a welded block 7 of aluminothermically produced steel thereon from which two teeth 4, shown in phantom in FIGURE 1, are machined after the completion of the aluminothermic reaction and removal of the mold.

It is possible to employ an aluminothermically produced steel which has a composition different from that of the base metal to be welded. The penetration and melting down of the base metal may be influenced by selecting the preheating temperature while taking into account the quantity of material to be welded. The process may also be used without preheating of the surfaces of the workpiece and may be utilized also for welding the joints of beveled workpieces. The welds made according to the process of the present invention show flawless transitions between the base metal and the welding material or weld metal and the complete absence of slag, whereby built-up welds especially may be made within a fraction of the time heretofore required using the known electric arc-welding and autogenous welding methods.

It will be obvious to those skilled in the art that many modifications may be made within the scope of the present invention without departing from the spirit thereof, and the invention includes all such modifications.

What is claimed is:

1. An aluminothermic built-up welding process which comprises covering the surface of a workpiece to be welded with a relatively low-melting point material consisting essentially of a welding powder for underpowder welding comprising amounts of CaO, MgO, and $CaF_2$ effective to protect the surfaces to be built up by welding from high-melting point slag produced during the aluminothermic reaction, said material being applied directly to said surface, applying an aluminothermic mass to the surface of the relatively low-melting point material and then igniting the mass to produce aluminothermic weld metal, and permitting this weld metal to fuse to the workpiece in the form of a built-up weld.

2. A process according to claim 1 in which the total weight of CaO, MgO, and $CaF_2$ in the relatively low-melting point material is at least 15 percent by weight.

3. A process according to claim 1 in which the relatively low-melting point material comprises effective amounts of CaO, MgO, $CaF_2$, MnO, $Al_2O_3$, and $SiO_2$.

4. A process according to claim 1 in which the relatively low-melting point material has a melting point of about 1050° C.

5. A process according to claim 1 in which the relatively low-melting point material is non-ferrous.

6. A process according to claim 1 in which welding is effected without preheating the workpiece.

References Cited

UNITED STATES PATENTS

| 1,294,209 | 2/1919 | Walker. |
| 1,607,508 | 11/1926 | Bottrill. |
| 1,727,570 | 9/1929 | Spilsbury. |
| 2,855,643 | 10/1958 | Anselmini et al. |
| 3,192,080 | 6/1965 | Cooper. |
| 3,161,928 | 12/1964 | Bishop et al. |
| 3,116,142 | 12/1963 | Rylander _____ 29—498.5 X |
| 3,231,368 | 1/1966 | Watson et al. _____164—53 X |
| 2,056,708 | 10/1936 | Boecker _____ 164—53 X |
| 1,594,182 | 7/1926 | Millward. |
| 1,671,730 | 5/1928 | Lange. |
| 2,515,191 | 7/1950 | Carpenter et al. |
| 1,940,619 | 12/1933 | Barstow et al. _____ 75—17 |
| 1,968,984 | 8/1934 | Binder _____ 148—26 |
| 2,193,246 | 3/1940 | Chace _____ 29—188 |
| 2,240,405 | 4/1941 | Kinzel _____ 164—52 |
| 2,327,065 | 8/1943 | Reimers _____ 148—26 |
| 3,031,346 | 4/1962 | Wasserman et al. _____ 148—26 |

FOREIGN PATENTS

| 1,191,208 | 4/1965 | Germany. |

OTHER REFERENCES

Metals Handbook, copyright 1961 by ASM, 8th ed., vol. 1, pp. 832–833. "Process Considerations," "Fluxes," "Preheating."

"Petroleum Refinery Piping" (p. 111), Am. Std. Code for Pressure Piping, published by ASME, A.S.A. B, Mar. 31, 1959. Recd. in Scientific Library Oct. 5, 1959, subdivision 331.1 and 331.2 Preheating.

J. SPENCER OVERHOLSER, *Primary Examiner.*

V. K. RISING, *Assistant Examiner.*

U.S. Cl. X.R.

29—498.5; 75—27; 148—26; 164—102